United States Patent
Fujita (10) Patent No.: US 11,370,362 B2
(45) Date of Patent: Jun. 28, 2022

(54) VEHICLE STORAGE DEVICE

(71) Applicant: MORIROKU TECHNOLOGY COMPANY, LTD., Tokyo (JP)

(72) Inventor: Kenji Fujita, Tokyo (JP)

(73) Assignee: MORIROKU TECHNOLOGY COMPANY LTD., Tokyo (JP)

(*) Notice: Subject to any disclaimer, the term of this patent is extended or adjusted under 35 U.S.C. 154(b) by 46 days.

(21) Appl. No.: 17/146,907

(22) Filed: Jan. 12, 2021

(65) Prior Publication Data
US 2021/0237656 A1 Aug. 5, 2021

(30) Foreign Application Priority Data

Jan. 31, 2020 (JP) .............................. JP2020-014645

(51) Int. Cl.
*B60R 7/06* (2006.01)
*E05D 3/02* (2006.01)

(52) U.S. Cl.
CPC ................. *B60R 7/06* (2013.01); *E05D 3/02* (2013.01); *E05Y 2900/538* (2013.01)

(58) Field of Classification Search
CPC B60R 7/06; E05D 3/02; E05D 7/1072; E05Y 2900/538
USPC ....................................................... 296/37.12
See application file for complete search history.

(56) References Cited

U.S. PATENT DOCUMENTS

| | | | | |
|---|---|---|---|---|
| 7,527,166 | B2* | 5/2009 | Kondo | B60R 11/00 220/830 |
| 9,260,898 | B2* | 2/2016 | Soma | E05D 7/1055 |
| 2015/0121654 | A1* | 5/2015 | Novin | E05D 11/082 16/273 |
| 2020/0131813 | A1* | 4/2020 | Wiepen | B60R 7/04 |
| 2021/0010190 | A1* | 1/2021 | Ahamad | D06F 39/14 |
| 2021/0010191 | A1* | 1/2021 | Ahamad | D06F 39/14 |
| 2021/0277694 | A1* | 9/2021 | Rivas | E05D 3/02 |
| 2021/0394682 | A1* | 12/2021 | Kwon | B60R 7/06 |

FOREIGN PATENT DOCUMENTS

JP 07-089390 4/1995

* cited by examiner

*Primary Examiner* — Pinel E Romain
(74) *Attorney, Agent, or Firm* — Rankin, Hill & Clark LLP

(57) ABSTRACT

A protrusion is formed on a facing surface which is integral with a shaft of a hinge mechanism. The protrusion has a tip that is in contact with an end surface of the engagement portion when the first member and the second member swing relative to each other, so that displacement of the second member along the lengthwise direction of the shaft is restricted. A state immediately after the engagement portion is engaged with the shaft is referred to as an initial engagement state. In the initial engagement state, the protrusion is situated at a position beyond a center of the shaft when viewed in a direction of engaging the engagement portion with the shaft, and the end surface of the engagement portion is separated from the tip of the protrusion.

12 Claims, 7 Drawing Sheets

VEHICLE STORAGE DEVICE

FIELD OF THE INVENTION

The present invention relates to vehicle storage devices including storage sections that can be opened and closed by use of hinge structures.

BACKGROUND OF THE INVENTION

Vehicle interiors are provided with storage devices for storing things. One of such vehicle storage devices is disclosed in, for example, Japanese Patent Application Laid-Open Publication No. H07-89390.

Japanese Patent Application Laid-Open Publication No. H07-89390 discloses a glove box as a storage device. The glove box is attached to an instrument panel by a hinge mechanism. The hinge mechanism includes shafts provided on the instrument panel and engagement portions provided on the glove box and having a substantially C shape that can engage with the shafts. As the glove box swings about the shafts with respect to the instrument panel, the storage section of the glove box is opened and closed.

Both ends of one of the shafts are integrally configured with a pair of facing surfaces, respectively. On the other hand, protrusions are provided at both ends of one of the engagement portions so as to protrude in the axial direction of the shaft. When the storage section of the glove box is fully opened, respective protrusions come into contact with the above-mentioned pair of facing surfaces. This can restrict axial movements of the glove box. As a result, the looseness of the glove box can be prevented.

SUMMARY OF THE INVENTION

A process of attaching the glove box to the instrument panel will be described. In order to engage one of the engagement portions of the glove box to one of the shafts of the instrument panel, it is necessary to place the engagement portion of the glove box between the two facing surfaces of the instrument panel.

However, as mentioned above, the engagement portion is provided with protrusions. When the glove box is fully opened, respective protrusions come into contact with the two facing surfaces. Accordingly, the interval between the two facing surfaces and the width of the engagement portion including the protrusions are substantially equal to each other. Since there is almost no gap between the facing surface and the protrusion, the engaging work requires time and effort. If the protrusions are not provided, the engaging work will be easy, but the looseness of the glove box cannot be restricted. It is desirable to enhance efficiency of the engaging work and to prevent looseness of the storage device.

An object of the present invention is to provide a technique that can restrict axial movement of the hinge mechanism without interfering with the engaging work for constructing the hinge mechanism.

According to one aspect of the present invention, there is provided a vehicle storage device including a first member, a second member, a hinge mechanism for connecting the first member to the second member, and a storage section disposed in at least one of the first member and the second member, the storage section having an opening that is opened and closed due to relative swing motion of the first member and the second member, the vehicle storage device is able to enter a fully closed state in which the opening is closed and a fully open state in which the opening is fully open, the hinge mechanism includes a shaft disposed on the first member and an engagement portion disposed on the second member, and the engagement portion has a substantially C shape that engages with the shaft, the first member has a pair of facing surfaces that are integral with the shaft, at least one of the facing surfaces has a protrusion protruding along a lengthwise direction of the shaft, the protrusion has a tip that can contact an end surface of the engagement portion when the first member and the second member swing relative to each other, so that displacement of the second member along the lengthwise direction of the shaft is restricted, and when the vehicle storage device enters an initial engagement state that is a state immediately after the engagement portion is engaged with the shaft, the protrusion is situated at a position beyond a center of the shaft when viewed in a direction of engaging the engagement portion with the shaft, and the end surface of the engagement portion is separated from the tip of the protrusion in the initial engagement state.

Preferably, a lateral surface of the protrusion inclines, when viewed in a direction opposite to the direction of engaging the engagement portion with the shaft, to guide the engagement portion toward a lengthwise center of the shaft.

Preferably, the shaft has an end portion adjacent to or on one of the two facing surfaces, a half surface of the end portion which is present on a proximal side from the center of the shaft when viewed in the direction of engaging the engagement portion with the shaft is referred to as a proximal surface, and a diameter of the proximal surface increases as the proximal surface approaches the above-mentioned one of the two facing surfaces.

Preferably, the tip of the protrusion and the engagement portion are always in contact with each other throughout a range from the fully open state to the fully closed state.

In accordance with the present invention, the facing surface, which is integral with the shaft of the hinge mechanism, is provided with the protrusion. When the first member and the second member swing relative to each other, the tip of the protrusion can contact the end surface of the engagement portion. Thus, the protrusion can restrict displacement of the second member along the lengthwise direction (axial direction) of the shaft. The vehicle storage device enters an initial engagement state, i.e., a state immediately after the engagement portion is engaged with the shaft. The protrusion is situated at a far position (beyond the center of the shaft when viewed in the engaging direction) in the initial engagement state, and the end surface of the engagement portion is separated from the tip of the protrusion in the initial engagement state. Accordingly, the protrusion does not interfere with the engagement of the engagement portion with the shaft. In addition, the protrusion can restrict the displacement of the second member along the lengthwise direction of the shaft. Consequently, the looseness of the second member in the axial direction of the shaft can be minimized without interfering with the engaging work for constructing the hinge mechanism.

In addition, when viewed in the direction opposite to the direction of engaging the engagement portion with the shaft, the lateral surface of the protrusion inclines to guide the engagement portion toward a lengthwise center of the shaft. When the first member or the second member is swung from the initial engagement state to the fully open state, the engagement portion may shift in the lengthwise direction of the shaft, but the lateral surface of the protrusion can gradually guide the engagement portion toward the lengthwise center of the shaft. This facilitates smooth transition of the storage device from the initial engagement state to the fully open state.

Further, a half surface of the shaft end portion which is present on a proximal side from the center of the shaft when viewed in the direction of engaging the engagement portion with the shaft is referred to as a proximal surface. The diameter of the proximal surface increases as the proximal surface approaches the facing surface, on which the shaft end portion is present. In other words, the connecting portion of the shaft to the facing surface is thicker. Therefore, the strength of the shaft is enhanced. In addition, the proximal surface becomes a guide for the engagement portion when the engagement portion is engaged with the shaft. This facilitates the engaging work.

Also, the tip of the protrusion and the engagement portion are always in contact with each other throughout the range from the fully open state to the fully closed state. Thus, throughout the normal range of movement of the vehicle storage device (the range from the fully open state to the fully closed state), the looseness of the vehicle storage device can always be restricted.

DETAILED DESCRIPTION OF THE PREFERRED EMBODIMENTS

An embodiment of the present invention will be described below with reference to the accompanying drawings. In the description below, "left" and "right" refer to left and right for a person in the vehicle, and "front" and "rear" refer to front and rear for the traveling direction of the vehicle. In the drawings, "Fr" indicates front, and "Rr" indicates rear. "L" indicates left when viewed from the person in the vehicle, and "R" indicates right when viewed from the person in the vehicle. "Up" indicates upward, and "Dn" indicates downward.

Figure 1A:
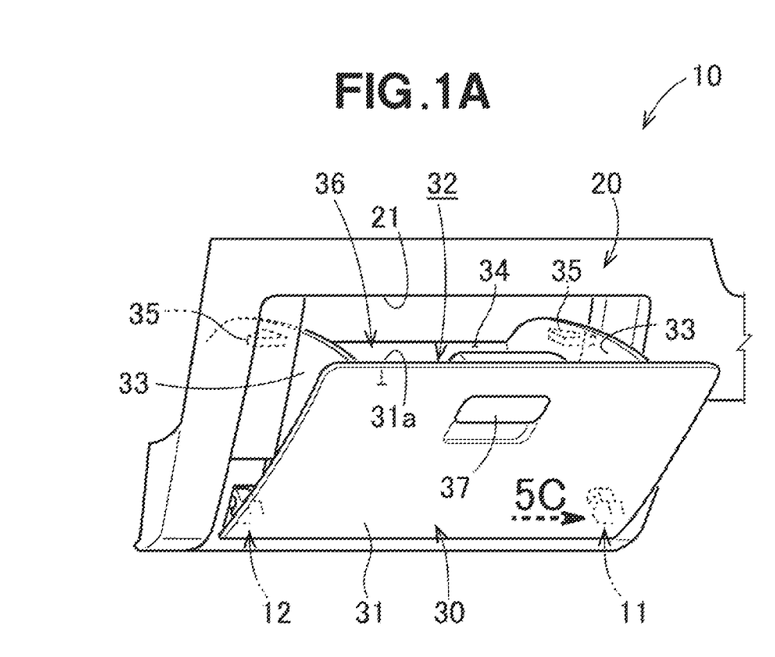
FIG. 1A is a diagram illustrating a storage device in a fully open state according to an embodiment of the present invention.

FIG. 1A shows a vehicle storage device 10 according to an embodiment. The vehicle storage device 10 includes an instrument panel 20 (first member) and a glove box 30 (second member) that is swingably attached to the instrument panel 20.

The glove box 30 has a lid 31 that can close an aperture 21 of the instrument panel 20 and a storage section 32 provided inside the lid 31. The storage section 32 is a space surrounded by the lid 31, a pair of substantially sectorial-shaped side walls 33 and 33 and a back wall (distal wall) 34 that faces the reverse face 31a of the lid 31. The two side walls 33 and 33 are provided with stoppers 35 and 35, respectively, that protrude laterally in the width direction of the vehicle to restrict the swing motion of the glove box 30. The state in which the stoppers 35 are in contact with the reverse face of the edge of aperture 21 of the instrument panel 20 is referred to as a fully open state, in which the opening 36 of the storage section 32 is most open.

Figure 1B:
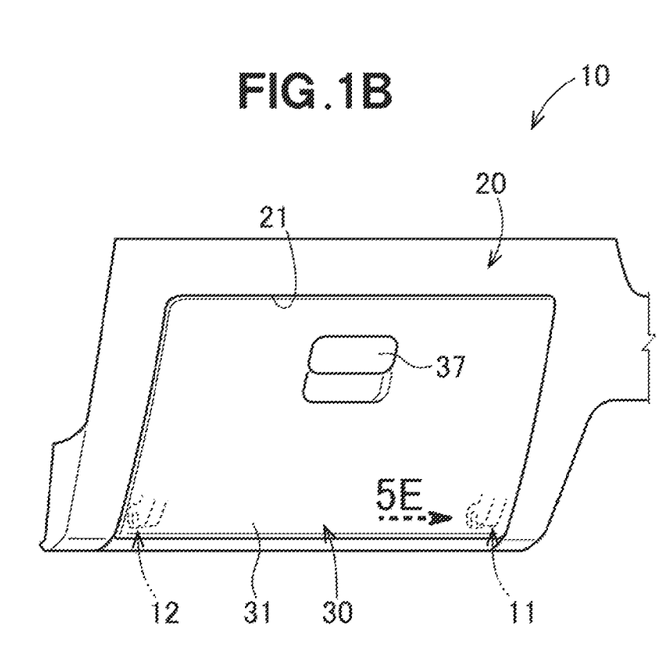
FIG. 1B is a diagram illustrating the storage device in a fully closed state.

FIG. 1B shows the glove box 30 in a fully closed state in which the opening 36 of storage section 32 is closed. A person in the vehicle opens and closes the glove box 30 by manipulating the handle 37 provided at an upper part of the lid 31 of the glove box 30.

Figure 2A:
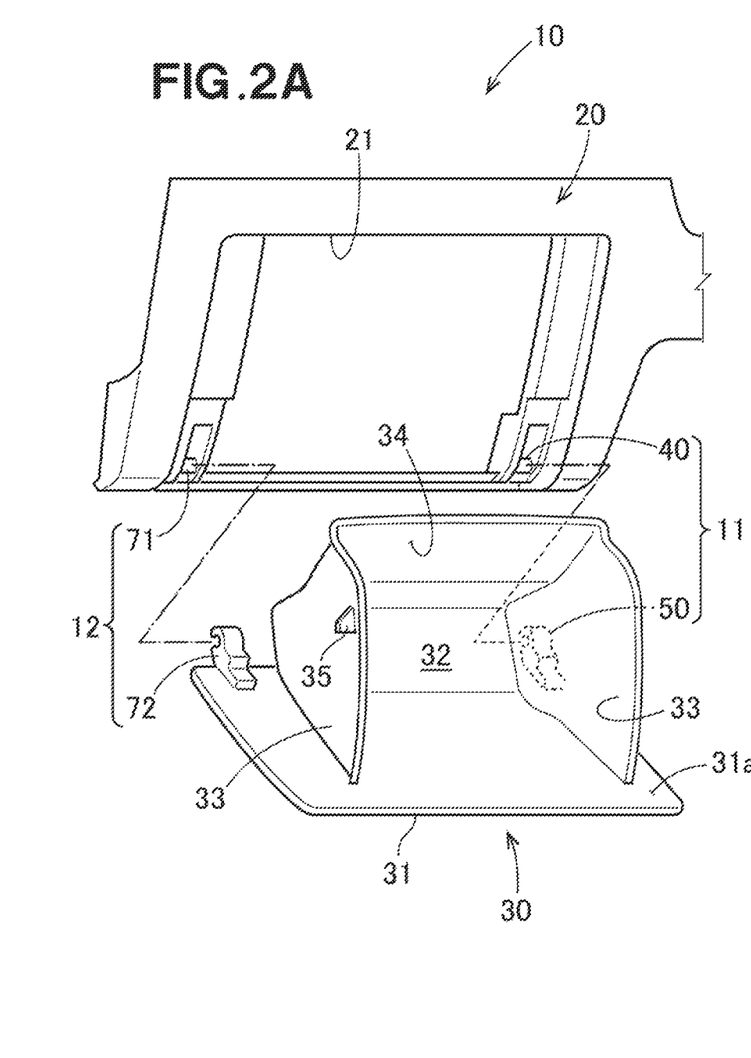
FIG. 2A is a diagram illustrating engaging of a first member and a second member.

Referring to FIG. 2A, the glove box 30 can be connected to the instrument panel 20 by a first hinge mechanism 11 and a second hinge mechanism 12.

The first hinge mechanism 11 includes a first shaft 40 disposed in the vicinity of the lower right corner of the aperture 21 of the instrument panel 20, and a first engagement portion 50 that is disposed at the lower right corner of the reverse face 31a of the lid 31 of the glove box 30 and that can be engaged with the first shaft 40. Alternatively, the instrument panel 20 may be provided with the first engagement portion 50, and the glove box 30 may be provided with the first shaft 40.

Similarly, the second hinge mechanism 12 includes a second shaft 71 disposed in the vicinity of the lower left corner of the aperture 21 and a second engagement portion 72 that can be engaged with the second shaft 71. By engaging the engagement portions 50 and 72 with the shafts 40 and 71, respectively, the glove box 30 is swingably attached to the instrument panel 20.

Figure 2B:
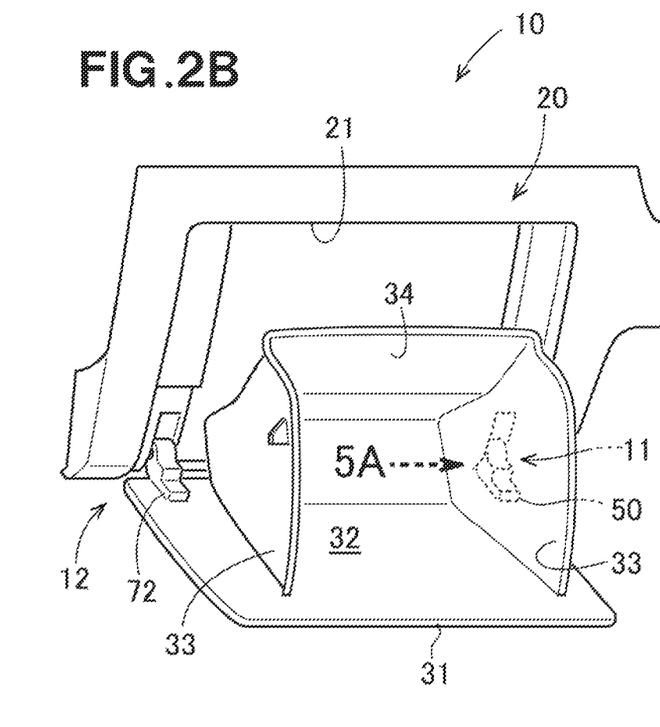
FIG. 2B is a diagram illustrating the storage device in an engaged state.

FIG. 2B shows the glove box 30 in an initial engagement state. The initial engagement state is a state immediately after the engagement portions 50 and 72 are engaged with the shafts 40 and 71.

Figure 3A:
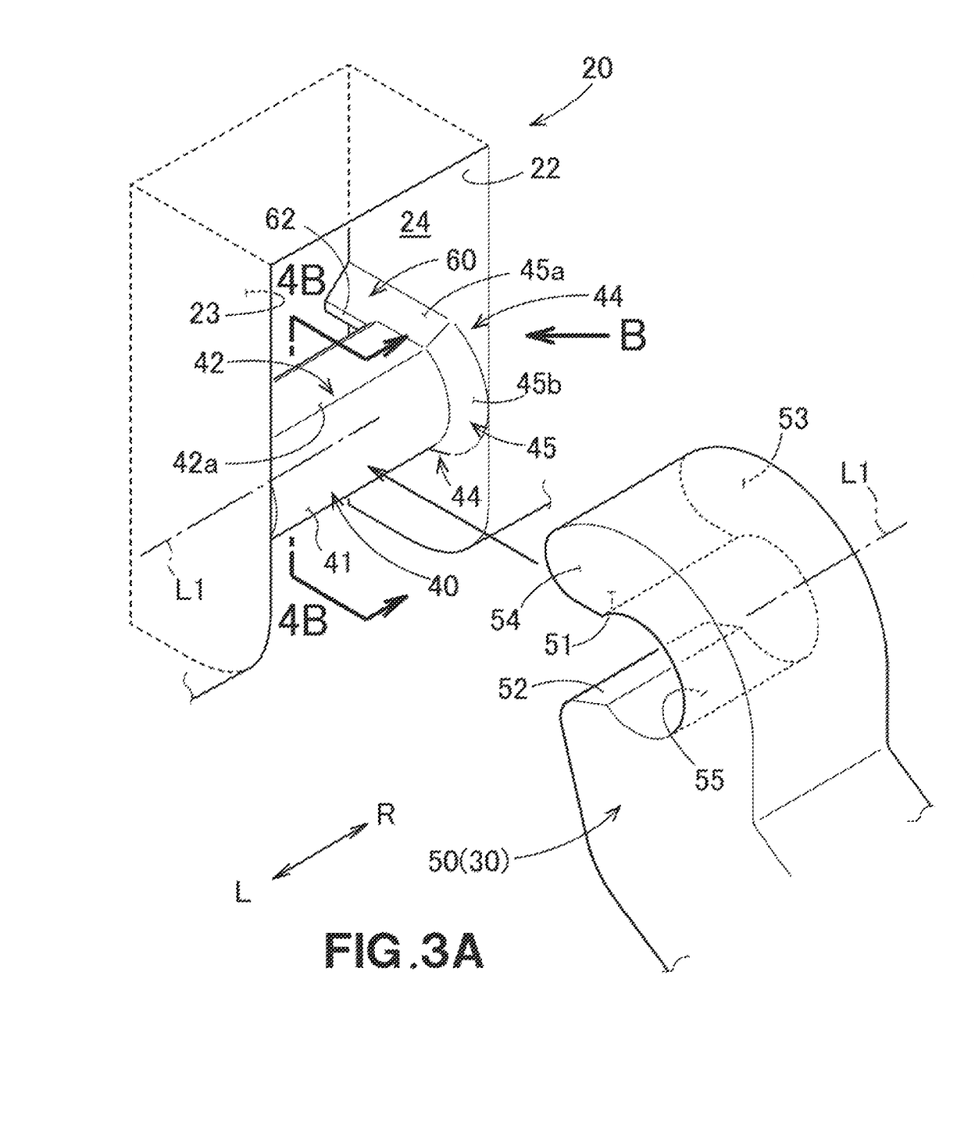
FIG. 3A is a diagram illustrating a shaft and an engagement portion of a hinge mechanism.

Referring to FIG. 3A, a lower part of the instrument panel 20 is provided with a first facing surface 22 and a second facing surface 23 (a pair of facing surfaces) facing each other. The first shaft 40 is shaped so as to extend from the first facing surface 22 to the second facing surface 23. The first shaft 40 is integrally configured with the first facing surface 22 and the second facing surface 23. The axis L1 of the first shaft 40 extends in a lateral direction (right-left direction). Above the first shaft 40, there is a receiving hole for receiving the upper part of the first engagement portion 50 when the first engagement portion 50 is engaged with the first shaft 40.

The first engagement portion 50 has a substantially C shape, and includes a first surface 51, a second surface 52, a first end surface 53, and a second end surface 54. The first surface 51 and the second surface 52 define an entrance for the first shaft 40 when the first engagement portion 50 is engaged with the first shaft 40. After the first engagement portion 50 is engaged with the first shaft 40, the first end surface 53 faces the first facing surface 22 and the second end surface 54 faces the second facing surface 23.

Figure 4A:
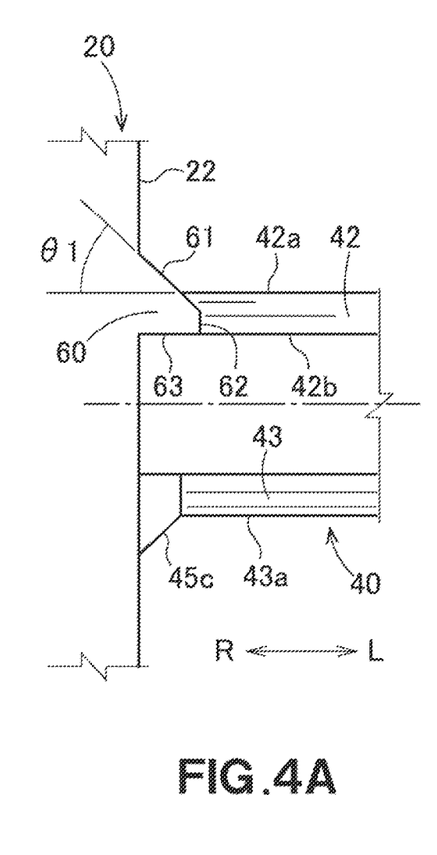
FIG. 4A is a diagram when viewed in the direction of the arrow 4A in FIG. 4B.
Figure 4B:
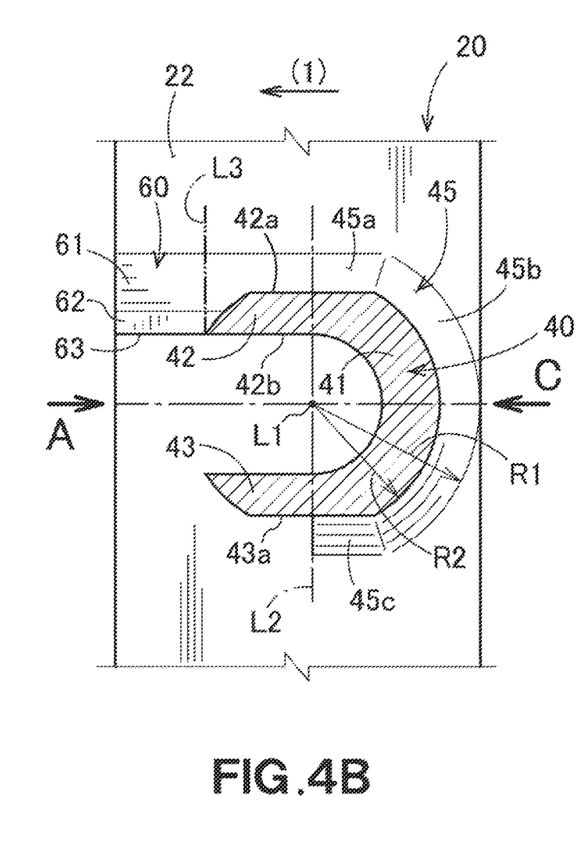
FIG. 4B is a cross-sectional view taken along the line 4B-4B in FIG. 3A.

Referring to FIG. 3A and FIG. 4B, the cross section of the first shaft 40 is substantially U-shaped. The first shaft 40 includes a curved portion 41, a first guide portion 42, and a second guide portion 43. When the glove box 30 swings, the inner peripheral surface 55 of the first engagement portion 50 slides on the curved portion 41. The first guide portion 42 and the second guide portion 43 extend forward from the opposite ends of the curved portion 41, respectively, and are used for guiding the first engagement portion 50 when the first engagement portion 50 is engaged with the first shaft 40. When the first engagement portion 50 is engaged with the first shaft 40, the end of the first surface 51 of the first engagement portion 50 is brought into contact with the upper surface 42a of the first guide portion 42. Similarly, when the first engagement portion 50 is engaged with the first shaft 40, the end of the second surface 52 of the first engagement portion 50 is brought into contact with the lower surface 43a of the second guide portion 43.

Hereinafter, the direction parallel to the upper surface 42a of the first guide portion 42 is referred to as an engagement direction (see the arrow (1) in FIG. 4B). In addition, a line vertically extending (intersecting orthogonally to the upper surface 42a) and passing through the axis L1 of the first hinge mechanism 11 is referred to as a reference line L2 (see FIG. 4B). When a person in the vehicle looks at the reference line L2 as a boundary line, the near side (right side in FIG. 4B) from the reference line L2 in the engagement direction is referred to as a near side or a proximal side, and the far side (left side in FIG. 4B) beyond the reference line L2 in the engagement direction is referred to as a far side or a distal side.

Figure 4C:
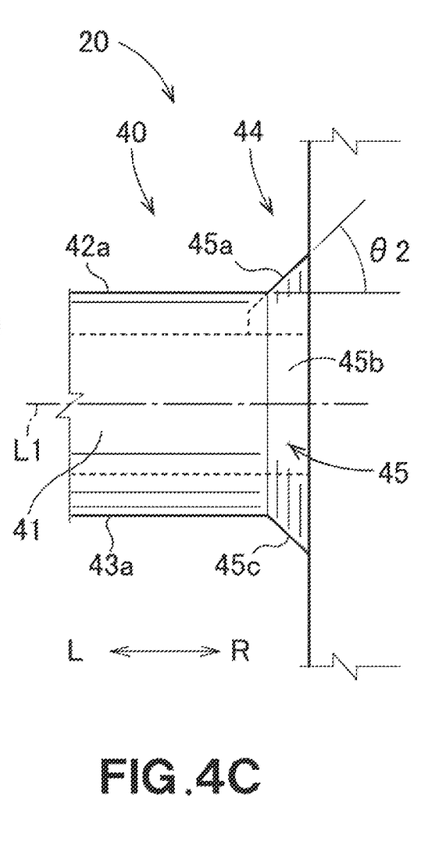
FIG. 4C is a diagram when viewed in the direction of the arrow 4C in FIG. 4B.

Referring to FIG. 4B and FIG. 4C, the first shaft 40 has a first end portion 44 on the first facing surface 22. The first end portion 44 has a first near-side surface (proximal surface) 45 that is an inclined surface extending in a half region of the first end portion 44 on the near side. The first near-side surface 45 includes an upper inclined surface 45a inclined with respect to the upper surface 42a, an outer peripheral surface 45b inclined with respect to the curved portion 41 and bending along the curved portion 41, and a lower inclined surface 45c inclined with respect to the lower surface 43a.

A part of the first end portion 44 including the outer peripheral surface 45b has a truncated cone shape. The outer peripheral surface 45b (or the first near-side surface 45) has a radius R1 that increases as the outer peripheral surface 45b approaches the first facing surface 22, on (or adjacent to) which the first end portion 44 is present. The outermost radius R1 of the outer peripheral surface 45b is larger than the radius R2 of the curved portion 41. The first near-side surface 45 may be a curved surface. The first shaft 40 has a second end portion on or adjacent to the second facing surface 23. The second end portion has a second near-side surface (second proximal surface) 47 that is an inclined surface formed on the near side (see FIG. 3B). The second near-side surface 47 has a symmetrical shape to the first near-side surface 45 with respect to the lengthwise center of the first shaft 40. Description of the second near-side surface 47 is omitted. The configuration and effects of the first near-side surface 45 also apply to the second near-side surface 47.

Referring to FIG. 3A and FIG. 4B, the first facing surface 22 has a first protrusion 60 that protrudes along the lengthwise direction of the first shaft 40. The first protrusion 60 is located on the far side of the reference line L2 in the engagement direction. The first protrusion 60 is integrally configured with the first shaft 40 and the first facing surface 22. The line L3 in FIG. 4B indicates an imaginary boundary line between the first protrusion 60 and the first shaft 40.

Referring to FIG. 4A (when viewed in the opposite direction to the engaging direction), the first protrusion 60 has an upper surface 61 (lateral surface) that is inclined such that the closer to the lengthwise center of the first shaft 40 a position of the upper surface 61 is, the closer to the axis L1 the position is. The inclination angle θ1 of the upper surface 61 is the same as the inclination angle θ2 of the upper inclined surface 45a of the first near-side surface 45 (see FIG. 4C). The first protrusion 60 has a lower surface 63 that is flush with the lower surface 42b of the first guide portion 42.

Figure 3B:
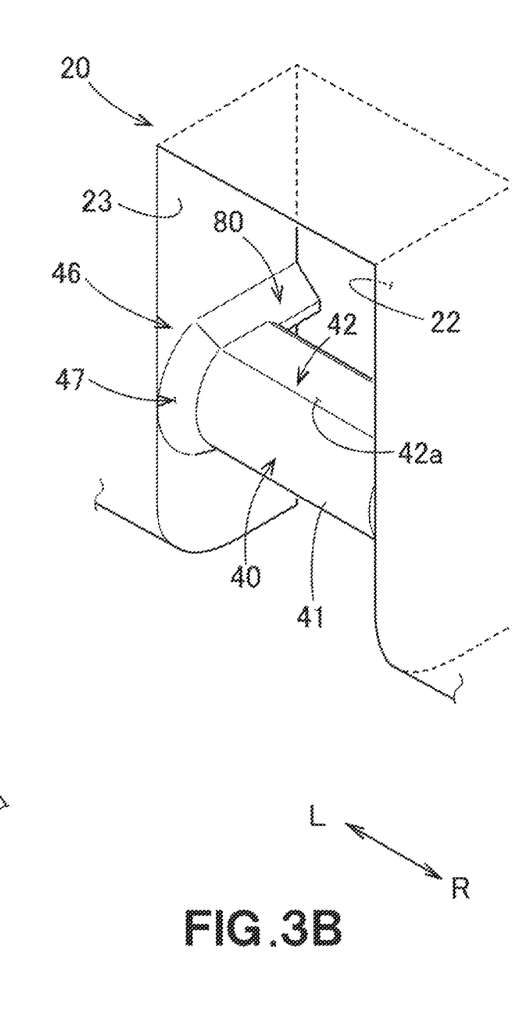
FIG. 3B is a diagram when viewed in the direction of the arrow 3B in FIG. 3A.

Referring to FIG. 3B, the second facing surface 23 has a second protrusion 80 that protrudes along the lengthwise direction of the first shaft 40. The second protrusion 80 is symmetrical to the first protrusion 60 with respect to the lengthwise center of the first shaft 40. Description of the second protrusion 80 is omitted. The configuration and effects of the first protrusion 60 also apply to the second protrusion 80.

Next, the first hinge mechanism 11 in the initial engagement state (see FIG. 2B), the fully open state (see FIG. 1A), and the fully closed state (see FIG. 1B) will be described.

Figure 5A:
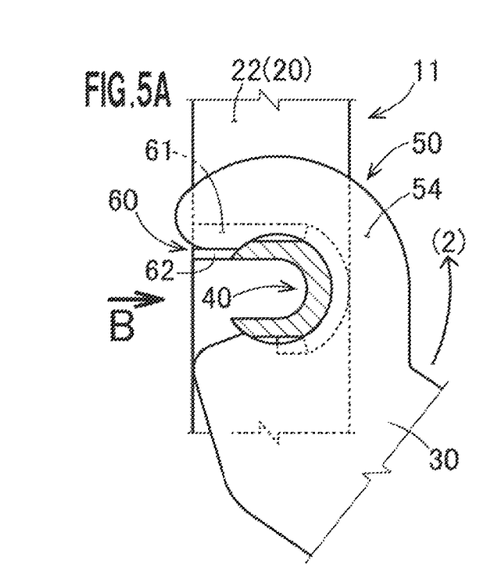
FIG. 5A is a diagram when viewed in the direction of the arrow 5A in FIG. 2B.
Figure 5B:
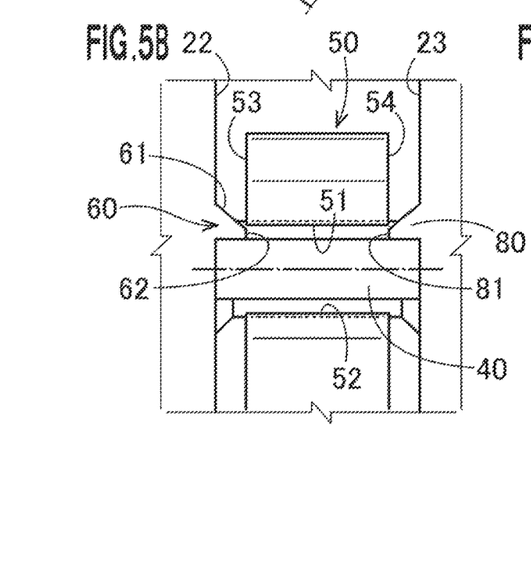
FIG. 5B is a diagram when viewed in the direction of the arrow 5B in FIG. 5A.

Referring to FIG. 5A and FIG. 5B, in the initial engagement state (the glove box 30 has not been swung at all since the engagement of the engagement portions 50 and 72 with the shafts 40 and 71), the tip 62 of the first protrusion 60 and the first end surface 53 of the first engagement portion 50 are separated from each other. The tip 62 of the first protrusion 60 is located closer to the second facing surface 23 than the first end surface 53. In the initial engagement state, the upper surface 61 of the first protrusion 60 may be in contact with or separated from the first engagement portion 50.

Figure 6A:
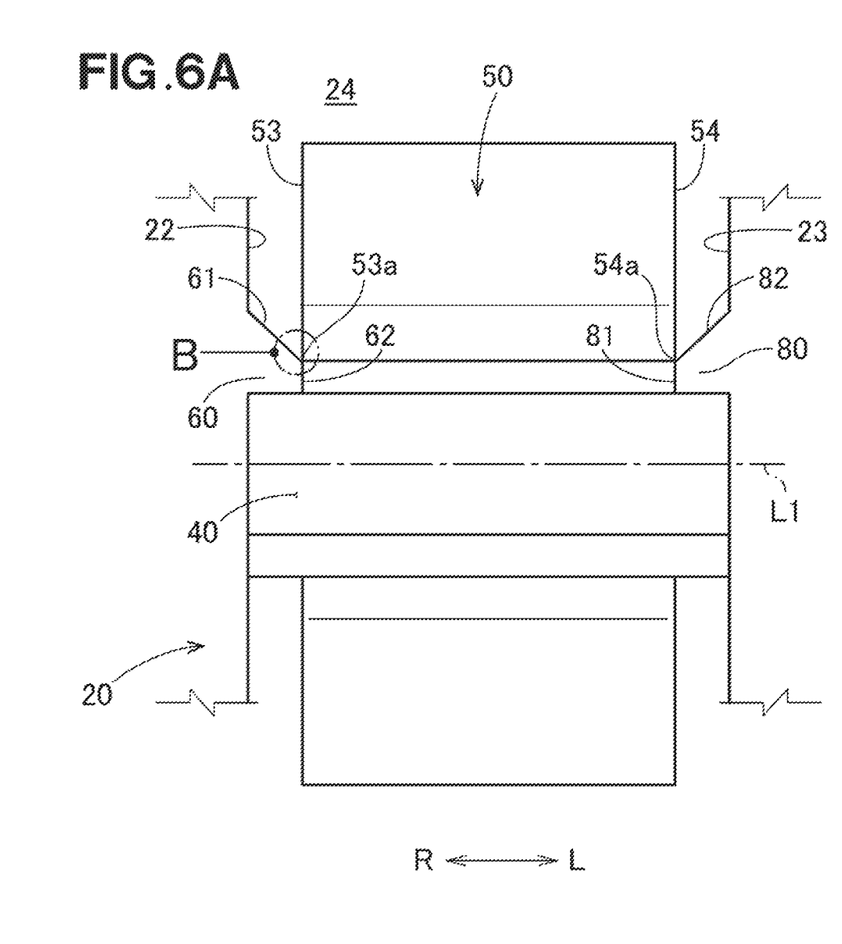
FIG. 6A is a diagram illustrating an effect of a lateral surface of a first protrusion.
Figure 6B:
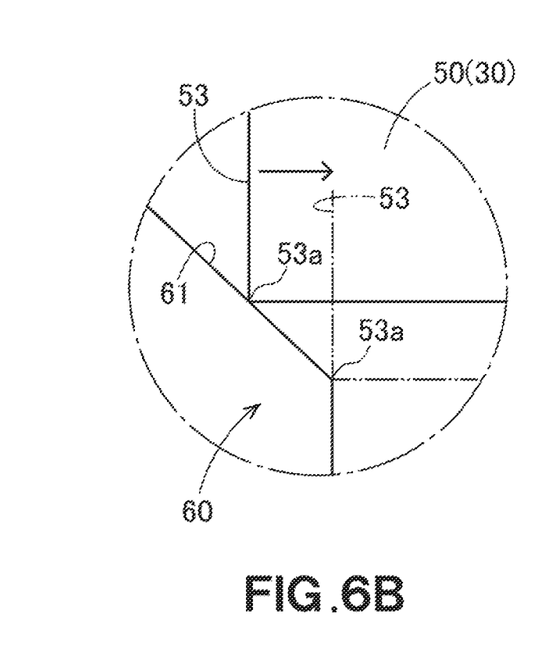
FIG. 6B is an enlarged view of a part B in FIG. 6A.

Let us assume that the glove box 30 is swung upward as indicated by the arrow (2) in FIG. 5A. As shown in FIG. 6A, when the glove box 30 is begun to be swung, the lower end 53a of the first end surface 53 of the first engagement portion 50 is brought into contact with the upper surface 61 of the first protrusion 60. Thereafter, as shown in FIG. 6B, the lower end 53a of the first end surface 53 begins to slide on the upper surface 61 of the first protrusion 60.

Figure 5C:
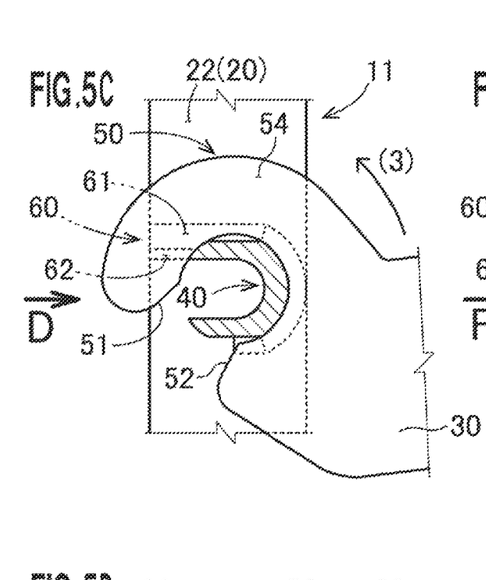
FIG. 5C is a diagram when viewed in the direction of the arrow 5C in FIG. 1A.
Figure 5D:
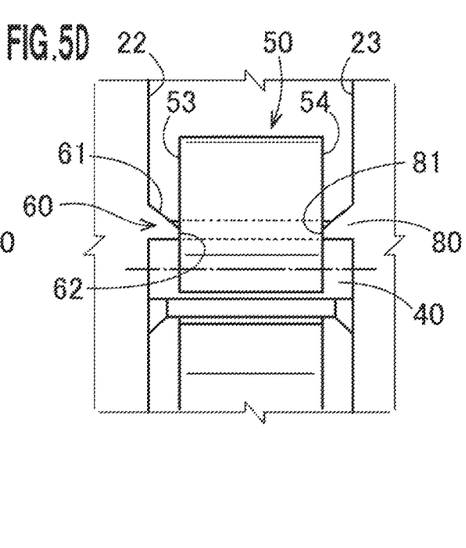
FIG. 5D is a diagram when viewed in the direction of the arrow 5D in FIG. 5C.

If the swing motion is continued, the glove box 30 will be fully opened as shown in FIG. 5C and FIG. 5D. In the fully open state, the first end surface 53 of the first engagement portion 50 is in contact with the tip 62 of the first protrusion 60.

Figure 5E:
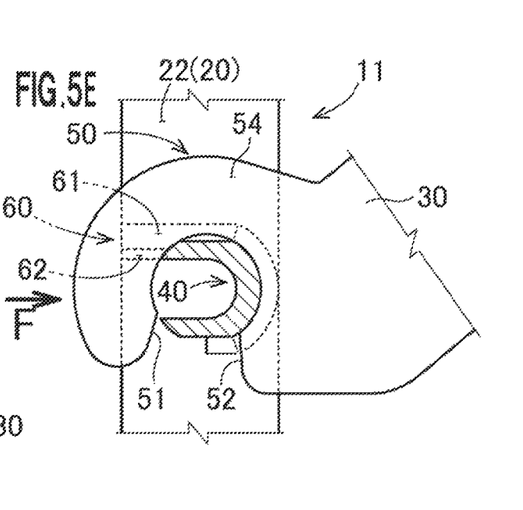
FIG. 5E is a diagram when viewed in the direction of the arrow 5E in FIG. 1B.
Figure 5F:
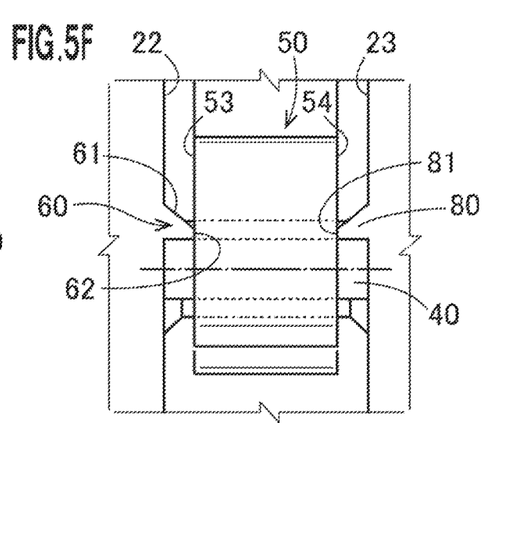
FIG. 5F is a diagram when viewed in the direction of the arrow 5F in FIG. 5E.

Furthermore, as indicated by the arrow (3) in FIG. 5C, when the glove box 30 is further swung upward from the fully open state, the glove box 30 enters the fully closed state (see FIG. 5E and FIG. 5F).

Throughout the range from the fully open state (FIG. 5D) to the fully closed state (FIG. 5F), the first end surface 53 of the first engagement portion 50 is continuously (always) in contact with the tip 62 of the first protrusion 60. It should be noted, however, that the first end surface 53 of the first engagement portion 50 may be brought into contact with the tip 62 of the first protrusion 60 for at least a certain range within the total range from the fully open state to the fully closed state.

Effects of the embodiment will be described.

Referring to FIG. 5A and FIG. 5B, the first protrusion 60 is located on the far side in the engagement direction. In the initial engagement state, the tip 62 of the first protrusion 60 and the first end surface 53 of the first engagement portion 50 are separated from each other. Accordingly, the first protrusion 60 does not interfere with the engagement of the first engagement portion 50 with the first shaft 40. On the other hand, as shown in FIG. 5C to FIG. 5F, in the range between the fully open state and the fully closed state, the first protrusion 60 can restrict the displacement of the first engagement portion 50 in the direction of the axis L1. Axial looseness of the glove box 30 can be minimized without interfering with the engaging work for constructing the first hinge mechanism 11.

Figure 7A:
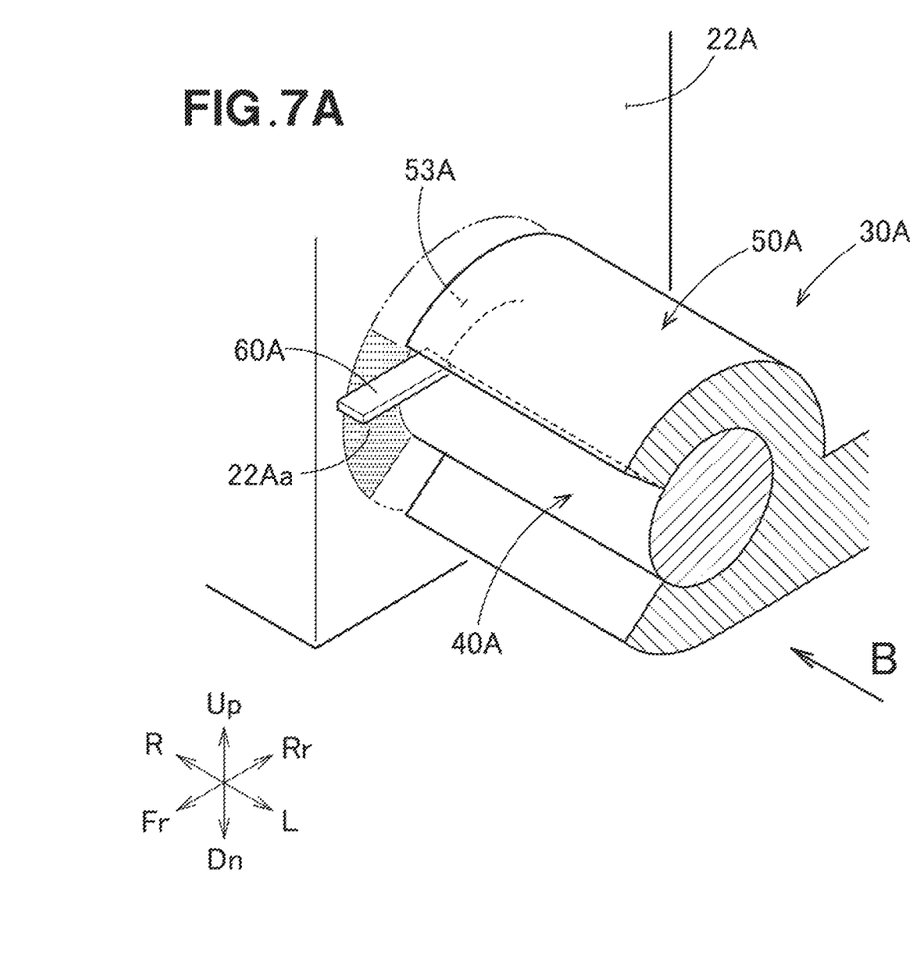
FIG. 7A is a diagram for supplementarily illustrating the position of the protrusion.
Figure 7B:
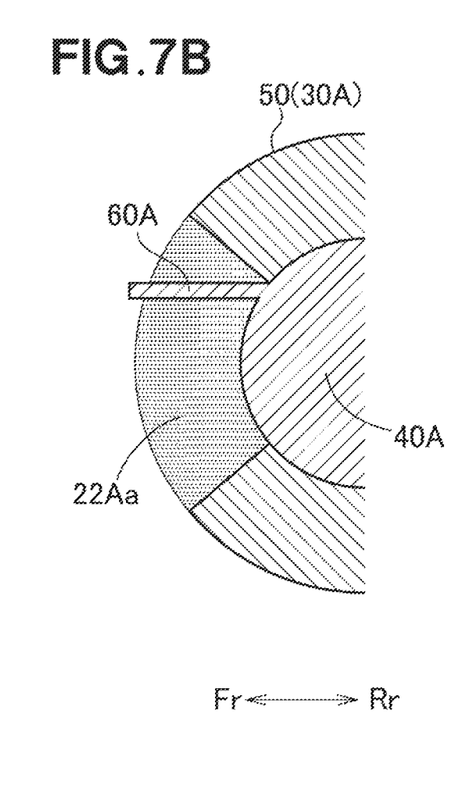
FIG. 7B is a diagram when viewed in the direction of the arrow 7B in FIG. 7A.

The position of first protrusion 60 will be described in detail. FIG. 7A and FIG. 7B schematically show a shaft 40A and an engagement portion 50A in the initial engagement state. The area 22Aa is an area of the first facing surface 22A that does not face the first end surface 53A in the initial engagement state and does face the first end surface 53A when the glove box 30 swings. If at least part of a first protrusion 60A is located within the area 22Aa, the first protrusion 60A will not interfere with the engagement of the engagement portion 50A with the shaft 40A. Of course, the first protrusion 60A is designed to prevent the looseness when the glove box 30A swings. Accordingly, the position of the first protrusion 60A in the area 22Aa may be appropriately selected according to the normal range of movement of the glove box 30A (within the range between the fully open state and the fully open state).

Referring to FIG. 3A and FIG. 3B, in this embodiment, the first facing surface 22 is provided with the first protrusion 60, and the second facing surface 23 is provided with the second protrusion 80. However, only one of the protrusions may be provided. In other words, one hinge mechanism may include one or two protrusions. The second hinge mechanism 12 (see FIG. 2A) also has one protrusion. Description of the second hinge mechanism 12 will be omitted.

Referring to FIG. 6A, the upper surface 61 of the first protrusion 60 is inclined such that the closer to the lengthwise center of the first shaft 40 a position of the upper surface 61 is, the closer to the axis L1 the position is. The upper surface 82 of the second protrusion 80 is also inclined such that the closer to the lengthwise center of the first shaft 40 a position of the upper surface 82 is, the closer to the axis L1 the position is. When the glove box 30 is begun to be swung, the lower end 53a of the first end surface 53 of the first engagement portion 50 is brought into contact with the upper surface 61 of the first protrusion 60, and then starts sliding on the upper surface 61. Similarly, the lower end 54a of the second end surface 54 of the first engagement portion 50 is brought into contact with the upper surface 82 of the second protrusion 80, and then starts sliding on the upper surface 82.

Referring to FIG. 6B, the first end surface 53 of the first engagement portion 50 gradually moves toward the center of the first shaft 40 as the glove box 30 swings from the initial engagement state. Thus, as the glove box 30 swings from the initial engagement state to the fully open state, the first engagement portion 50 is guided to gradually move to the lengthwise center of the first shaft 40. Compared with a configuration in which the upper surfaces 61 and 82 are not inclined (for example, in a configuration in which the upper surfaces 61 and 82 are orthogonal to the facing surfaces 22 and 23), the swing motion of the glove box 30 can be achieved smoothly from the initial engagement state to the fully open state.

Referring to FIG. 3A, the first end portion 44 of the first shaft 40 has the thicker portion on the near side. This increases the strength of the first shaft 40. In addition, the first near-side surface 45 is inclined and serves as a guide element for the first engagement portion 50 when the first engagement portion 50 is engaged with the first shaft 40. Thus, the engaging work becomes easy.

Referring to FIG. 5C and FIG. 5D, throughout the range from the fully open state to the fully closed state, tip 62 of the first protrusion 60 and the first end surface 53 of the first engagement portion 50 are always in contact with each other. Therefore, when the glove box 30 is used, the looseness of the glove box 30 can always be prevented or suppressed.

The vehicle storage device 10 having the glove box 30 has been described as an example of a vehicle storage device according to the present invention, but the present invention is intended to encompass a wide variety of embodiments of storage devices provided in vehicle interiors and having openings that are opened and closed by hinge mechanisms. For example, the configuration described above may be adopted for console boxes. That is, the present invention is not limited to the embodiment as long as the effects of the present invention are achieved.

The vehicle storage device of the present invention is suitable for glove boxes of four-wheeled vehicles.

In the following description, for purpose of explanation, numerous specific details are set forth in order to provide a thorough understanding of disclosed embodiment. It will be apparent, however, that one or more embodiments may be practiced without these specific details. In other instances, well-known structures and devices are schematically shown in order to simplify the drawing.

What is claimed is:

1. A vehicle storage device comprising:
a first member;
a second member;
a hinge mechanism for connecting the first member to the second member; and
a storage section disposed in at least one of the first member and the second member, the storage section having an opening that is opened and closed due to relative swing motion of the first member and the second member, the vehicle storage device being able to enter a fully closed state in which the opening is closed and a fully open state in which the opening is fully open,
the hinge mechanism comprising a shaft disposed on the first member and an engagement portion disposed on the second member, the engagement portion having a substantially C shape that engages with the shaft,
the first member comprising a pair of facing surfaces that are integral with the shaft, at least one of the facing surfaces having a protrusion protruding along a lengthwise direction of the shaft,
the protrusion comprising a tip that is in contact with an end surface of the engagement portion when the first member and the second member swing relative to each other, so that displacement of the second member along the lengthwise direction of the shaft is restricted, and when the vehicle storage device enters an initial engagement state that is a state immediately after the engagement portion is engaged with the shaft, the protrusion is situated at a position beyond a center of the shaft when viewed in a direction of engaging the engagement portion with the shaft, and the end surface of the engagement portion is separated from the tip of the protrusion in the initial engagement state.

2. The vehicle storage device according to claim 1, wherein a lateral surface of the protrusion inclines, when viewed in a direction opposite to the direction of engaging the engagement portion with the shaft, to guide the engagement portion toward a lengthwise center of the shaft.

3. The vehicle storage device according to claim 1, wherein the shaft comprises an end portion adjacent to or on one facing surface of the pair of facing surfaces, a half surface of the end portion which is present on a proximal side from the center of the shaft when viewed in the direction of engaging the engagement portion with the shaft is referred to as a proximal surface, and a diameter of the proximal surface increases as the proximal surface approaches the one facing surface.

4. The vehicle storage device according to claim 2, wherein the shaft comprises an end portion adjacent to or on one facing surface of the pair of facing surfaces, a half surface of the end portion which is present on a proximal side from the center of the shaft when viewed in the direction of engaging the engagement portion with the shaft is referred to as a proximal surface, and a diameter of the proximal surface increases as the proximal surface approaches the one facing surface.

5. The vehicle storage device according to claim 1, wherein the tip of the protrusion and the engagement portion are always in contact with each other throughout a range from the fully open state to the fully closed state.

6. The vehicle storage device according to claim 2, wherein the tip of the protrusion and the engagement portion are always in contact with each other throughout a range from the fully open state to the fully closed state.

7. The vehicle storage device according to claim 3, wherein the tip of the protrusion and the engagement portion are always in contact with each other throughout a range from the fully open state to the fully closed state.

8. The vehicle storage device according to claim 4, wherein the tip of the protrusion and the engagement portion are always in contact with each other throughout a range from the fully open state to the fully closed state.

9. A vehicle storage device comprising:
a first member;
a second member;
a hinge mechanism for connecting the first member to the second member; and
a storage section disposed in at least one of the first member and the second member, the storage section having an opening that is opened and closed due to relative swing motion of the first member and the second member,
the hinge mechanism comprising a shaft disposed on the first member and an engagement portion disposed on the second member, the engagement portion having a substantially C shape that engages with the shaft,
the vehicle storage device being able to enter a fully closed state in which the opening is closed and a fully open state in which the opening is fully open,
the first member comprising a pair of facing surfaces which are integral with the shaft, at least one of the facing surfaces having a protrusion protruding along a lengthwise direction of the shaft,
the protrusion comprising a tip that can contact an end surface of the engagement portion, and
the protrusion being situated at a position beyond a center of the shaft when viewed in a direction of engaging the engagement portion with the shaft.

10. The vehicle storage device according to claim 9, wherein at least one lateral surface of the protrusion inclines toward a lengthwise center of the shaft.

11. The vehicle storage device according to claim 9, wherein the shaft comprising an end portion adjacent to or on one facing surface of the pair of facing surfaces, a half surface of the end portion which is present on a proximal side from the center of the shaft when viewed in the direction of engaging the engagement portion with the shaft is referred to as a proximal surface, and a diameter of the proximal surface increases as the proximal surface approaches the one facing surface.

12. The vehicle storage device according to claim 9, wherein the tip of the protrusion and the engagement portion are always in contact with each other throughout a range from the fully open state to the fully closed state.

* * * * *